United States Patent [19]

Valek et al.

[11] 4,128,885
[45] Dec. 5, 1978

[54] DIGITAL CIRCUITRY FOR SPARK TIMING AND EXHAUST GAS RECIRCULATION CONTROL

[75] Inventors: Robert J. Valek, Wheaton; Todd H. Gartner, Elmhurst, both of Ill.

[73] Assignee: Motorola, Inc., Schaumburg, Ill.

[21] Appl. No.: 798,067

[22] Filed: May 18, 1977

[51] Int. Cl.² .................. F02M 25/06; F02D 5/00
[52] U.S. Cl. .................. 364/424; 123/32 EB; 123/119 A; 340/347 NT; 364/442
[58] Field of Search ............... 364/424, 442, 200, 900, 364/606, 607, 718, 719, 851; 123/32 EB, 119 A, 117 R; 307/229; 340/347 NT, 347 AD

[56] References Cited

U.S. PATENT DOCUMENTS

| | | | |
|---|---|---|---|
| 3,440,614 | 4/1969 | Pagel | 364/200 |
| 3,462,618 | 8/1969 | Miyata | 307/229 |
| 3,749,894 | 7/1973 | Avdeef | 364/606 |
| 3,824,559 | 7/1974 | Grundy | 364/718 |
| 3,904,856 | 9/1975 | Monpetit | 123/32 EB |
| 3,915,134 | 10/1975 | Young et al. | 123/119 A |
| 3,975,727 | 8/1976 | Mader et al. | 340/347 NT |
| 4,001,557 | 1/1977 | Stephenson | 364/718 |
| 4,026,256 | 5/1977 | Fenn | 123/119 A |
| 4,034,719 | 7/1977 | Monpetit | 123/32 EB |
| 4,044,738 | 8/1977 | Williams et al. | 123/119 A |
| 4,063,539 | 12/1977 | Gorille et al. | 364/424 |

OTHER PUBLICATIONS

Analog-Digital Conversion Handbook, 1972, published by Analog Devices, Inc., Norwood, MA, pp. 1-64/65.

Primary Examiner—Felix D. Gruber
Attorney, Agent, or Firm—James W. Gillman; Donald J. Lisa; Phillip H. Melamed

[57] ABSTRACT

A digital signal processing circuit for controlling the spark timing and exhaust gas recirculation (EGR) of an internal combustion engine is disclosed herein. The circuit first samples the magnitude of the vacuum manifold pressure and produces a complex function analog output signal in response thereto. The output signal is produced by first converting the vacuum pressure to a digital signal, then using a read only memory to produce a complex function digital output signal and then reconverting the digital output signal to an analog output signal. The pressure analog output signal is then stored in a first holding device. Subsequently, an analog signal proportional to the period of engine revolution is sampled by the same circuit. However, the circuit now develops a digital output signal which is a function of the inverse of this analog input signal and this inverse digital output signal is effectively multiplied by the held pressure analog signal to produce an EGR analog control voltage which is stored in a second holding device. Subsequently, an analog output signal which is a different inverse function of the engine period is developed and stored in the first holding device and then the EGR analog output signal is processed by the circuit and effectively multiplied by the analog signal now being held in the first holding device to produce a spark timing control analog output signal which is stored in a third holding device. The EGR control signal in the second holding device controls how much exhaust gas will be reinjected into the cylinders of the internal combustion engine and the spark timing control signal in the second holding device adjusts the timing of the sparks generated for the cylinders of the internal combustion engine.

22 Claims, 4 Drawing Figures

DIGITAL CIRCUITRY FOR SPARK TIMING AND EXHAUST GAS RECIRCULATION CONTROL

BACKGROUND OF THE INVENTION

The invention relates generally to the field of analog and digital signal processing circuitry and more particularly to the use of such circuitry in a spark timing and exhaust gas recirculation (EGR) control system for an internal combustion engine.

The desired timing for spark ignition of an internal combustion engine is known to be a complex function of the primary engine variables of engine speed and the vacuum pressure produced by the engine, as well as a function of many other engine variables. Likewise, the amount of exhaust gases which should be reinjected into the internal combustion engine cylinders to insure minimum polution levels and more complete fuel utilization is also a complex function of both of these primary engine variables.

Generally, the ignition spark timing is controlled by a mechanical advance system in which the engine speed, by virtue of centrifugal force, is utilized to alter the mechanical position of a cam which determines the spark timing. In addition, the vacuum pressure produced by the engine is also used to simultaneously mechanically alter the position of this cam and therefore also control spark timing.

Some electronic ignition timing systems have proposed accomplishing the same result by electronic rather than mechanical apparatus. Some of these systems have also tried to control the amount of exhaust gas recirculation in accordance with the engine variables of speed and vacuum pressure. These systems generally implement the complex relationships between the output quantities of desired spark timing and desired exhaust gas recirculation and the input quantities of engine speed and vacuum pressure by either utilizing complex and inaccurate analog signal processing circuitry or complex, costly and redundant digital processing circuitry. The prior art analog processing circuits generally comprise a plurality of zener diodes each breaking down at different analog input levels such that a piecewise linear transfer function is implemented. The prior art digital processing circuits generally comprise separate analog to digital (A/D) converters for each of the primary engine variables and separate digital function generators, preferably read only memories (ROMs), which implement complex function digital output signals for each engine variable. These digital processing circuits then generally add the digital outputs of each of the ROMs in a single accumulator. Thus the digital processing circuits merely provide separately added complex functions of each of the primary engine variables. Therefore, these digital circuits can not implement a complex output function which is the product of complex output functions which depend on each of the primary engine variables.

Most prior art analog to digital converters receive an analog input signal and produce a digital output signal which is directly proportional to the magnitude of the analog input signal. In many applications it is much more desirable to have a digital output which is inversely proportional to the magnitude of the analog input signal. However, prior signal processing circuits have not been able to readily implement this function and have only been able to approximate this function by the use of complex and costly circuitry. In ignition systems, the engine spark timing and exhaust gas recirculation control are functions of engine speed. However, generally only an analog signal proportional to the period of engine revolution is readily produced and the period of engine revolution is inversely related to engine speed. Thus prior art ignition systems must either convert this period related analog signal to its inverse in order to produce the proper spark timing and exhaust gas recirculation control, or the variation of spark timing and exhaust gas recirculation as a function of engine speed must be compromised. Either of these results is undesirable.

SUMMARY OF THE INVENTION

An object of the present invention is to provide improved signal processing circuitry which can be adapted for use in an ignition system of an internal combustion engine and which overcomes all of the aforementioned disadvantages.

A more particular object of the present invention is to provide an improved signal processing circuit which readily develops an output signal that is a complex function of two variable inputs, and also to provide an ignition system which uses this improved signal processing circuit.

A further object of the present invention is to provide improved analog to digital converter circuitry which receives an analog signal and produces a digital output signal which is a function of the inverse of the magnitude of the received analog signal.

A still further object of the present invention is to provide an improved analog to digital converter circuit which selectively receives first and second inputs signals and produces corresponding output signals which are inverse and direct functions of the input signals, respectively.

An additional object of the present invention is to provide an improved analog function generator which readily produces an output analog signal which is a complex function of an analog input signal, and to provide an ignition system of an internal combustion engine which uses such an analog function generator.

Another object of the present invention is to provide an improved spark timing and exhaust gas recirculation control system.

In one embodiment of the present invention, an improved signal processing circuit which develops an output that is a complex function of two variable inputs is provided. The signal processing circuit comprises: programmable transfer function means for receiving an input signal and producing an output signal having a selectable predetermined relationship to the input signal; means for supplying a first input signal to said transfer function means while selecting a first relationship therefore; first storage means for storing a quantity related to the output of said transfer function means produced in response to said first input signal; means for supplying a second input signal to said transfer means after said first input signal while selecting a second relationship for said transfer function means; and means for effectively multiplying the output of said function means produced in response to said second signal by a factor related to said stored quantity to produce a complex output signal, whereby a single programmable function means can sequentially process two variable signals and develop a complex output signal which is a product function of both of the variable input signals.

Preferably, the signal processing circuit described above would be used in a spark timing and exhaust gas recirculation (EGR) control system in which the first input signal would correspond to an analog signal related to either engine speed or engine vacuum pressure, and the second input signal would correspond to the other one of these variables. Preferably the programmable transfer function means includes an analog to digital converter followed by a counter and a programmable ROM. The multiplying means comprises a controllable switch and a digital to analog (D/A) converter which multiplies the digital output of the ROM produced in response to the second input signal by an analog voltage that represents the output of the programmable transfer function means in response to the first input signal. In this way a complex analog output signal is obtained which is the multiplied product of two output functions which are independently related to two independent primary engine variables, such as engine speed and engine vacuum pressure.

The present invention also provides improved analog to digital converter circuitry which can receive a variable magnitude analog input signal and produce a digital output signal which is a function of the inverse of the magnitude of the input signal. This improved analog to digital converter circuitry comprises: at least one capacitor; first means for setting the charge on said capacitor to a first predetermined charge level; second means for subsequently altering the charge on said capacitor from said first charge level at a predetermined rate; means for comparing the charge on said capacitor to a predetermined reference level; means for producing a digital signal related to the duration of time between the time of starting to alter the charge on said capacitor at said predetermined rate and the time that said comparing means determines the charge on said capacitor to be equal to the predetermined reference level; and means for sequentially activating said first and second charge determining means and maintaining said first charge level at a fixed value while determining said predetermined rate directly in accordance with the variable magnitude of an analog input signal. In this manner the produced digital signal will be a function of the inverse of the magnitude of the analog input signal. Preferably, the first means for setting the charge on the capacitor comprises a means for altering the charge on said capacitor for a predetermined time at another predetermined rate, and the sequentially activating means maintains the first charge level at the fixed value by keeping this other rate constant.

This analog to digital converter circuitry is preferably used in the signal processing circuit described above as part of the programmable transfer function means which processes an analog input signal that is directly proportional to the period of engine revolution. Previously, the connections to the analog to digital converter circuitry were reversed such that when a second input signal was received, the charge on the capacitor was initially varied at a rate determined directly in accordance with the magnitude of the second signal for said predetermined period of time and then the charge on the capacitor was oppositely altered at a fixed rate. In this manner, the output of the analog to digital converter circuitry would be a digital signal which was a direct function of the magnitude of the second signal. Thus the analog to digital converter circuitry is selectively able to produce an output signal which is either directly a function of the magnitude of an input signal or is an inverse function of the magnitude of an input signal. Thus the analog to digital converter circuitry of the present invention can be used whenever either a direct or inverse function output signal is desired.

The signal processing circuit described above generally contemplates the use of an analog to analog function generator in which an input analog signal is first converted to a digital signal which is subsequently received by a digital programmable transfer function means, a read only memory, which is then followed by a digital to analog converter that produces an output analog signal which has a predetermined functional relationship to the input analog signal. In this manner an output analog signal which bears a complex functional relationship to an input analog signal can be implemented without the use of a plurality of zener diodes having different breakdown voltages.

The present invention provides for developing not only a spark timing control analog output signal by the use of the signal processing circuit described above, but also provides for developing an exhaust gas recirculation (EGR) analog control signal by using the same signal processing circuit. This is accomplished by selecting additional functional relationships for the programmable transfer function means and by selectively supplying additional input signals thereto. Thus a single programmable transfer function means is able to sequentially process engine speed and engine vacuum pressure analog input signals and produce output signals each of which comprises independent multiplied functions of both of the primary engine variables. In this manner excessive signal processing circuitry is eliminated and an efficient control system for spark timing and exhaust gas recirculation is provided.

BRIEF DESCRIPTION OF THE DRAWINGS

For a more complete understanding of the invention reference should be made to the drawings, in which.

DESCRIPTION OF THE PREFERRED EMBODIMENT

Figure 1:
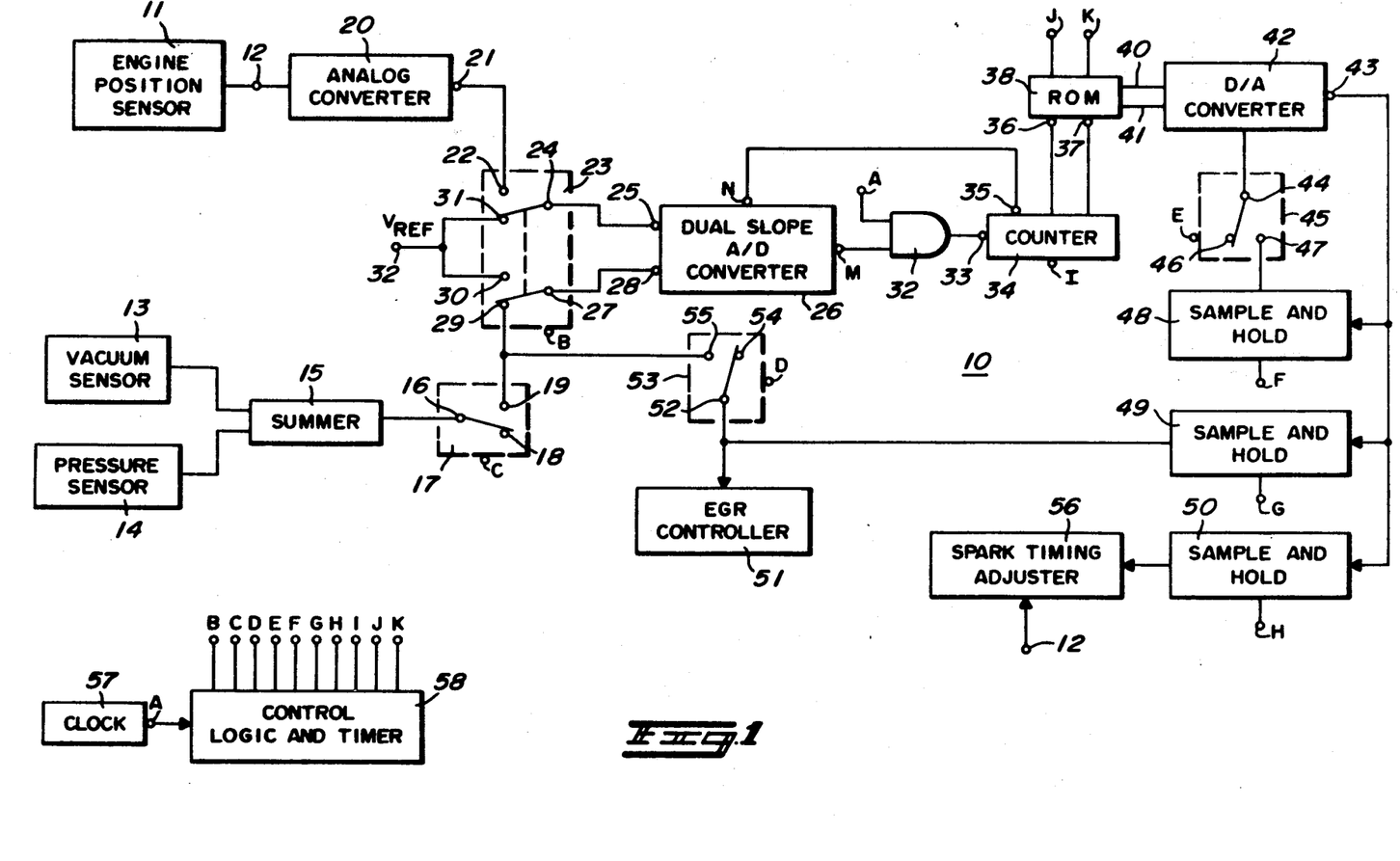
FIG. 1 is a block and schematic diagram of a spark timing and exhaust gas recirculation control system for an internal combustion engine.

FIG. 1 illustrates a spark timing and exhaust gas recirculation (EGR) control system 10 for an internal combustion engine (not shown). The system includes an engine position sensor 11 which senses engine crankshaft position and produces a digital signal (waveform P in FIG. 4) in response thereto at an output terminal 12, an engine vacuum pressure sensor 13 which produces an analog output signal representative of the vacuum pressure produced by the engine and a barometric air pressure sensor 14 which produces an analog output signal representative of the absolute air pressure.

The pressure sensors 13 and 14 are coupled into an analog summer 15 which receives both of the analog signals and produces a combined output analog signal that is coupled to a wiper arm terminal 16 of a controllable two position switch 17 (shown dashed). The summer 15 merely adds the analog voltages of the sensors 13 and 14 and therefore is a component readily known to those of average skill in the art.

The switch 17 is electronically controlled by signals received at a control terminal C. For a low voltage at terminal C, the switch 17 is in its first position and the wiper terminal 16 is electrically connected to an isolated terminal 18. For a high voltage at terminal C the switch is in its second position and the wiper terminal 16 is connected to a terminal 19. The controllable switch 17 therefore merely represents an electronic switch or relay which is controlled by the waveform received at the terminal C, and the switch is merely illustrated as a rotary two position switch in FIG. 1 for clarity.

The digital signal produced by the engine position sensor 11 at the terminal 12 is coupled to an analog converter 20 which receives this signal and produces an analog signal at an output terminal 21 which is directly proportional to the period of engine revolution. The terminal 21 is coupled to a terminal 22 of a controllable switch 23 (shown dashed) which basically comprises two, two position switches which have their wiper arms ganged together. The switch 23 has a first wiper arm terminal 24 which is coupled to a first input terminal 25 of a dual slope analog to digital (A/D) converter 26, and a second wiper arm terminal 27 which is coupled to a second input terminal 28 of the converter 26. The terminal 19 of the switch 17 is directly connected to a terminal 29 of the switch 23, and terminals 30 and 31 of the switch 23 are both connected to a terminal 32 at which at constant reference potential $V_{ref}$ if applied. The switch 23 has two positions which are selected by the voltage at a control terminal B. For a low voltage at terminal B, switch 23 is in its first position and the terminals 24 and 27 are connected to the terminals 31 and 29, respectively. For a high voltage at B the terminals 24 and 27 are connected to the terminals 22 and 30, respectively.

The dual slope converter 26 receives the signals present at the terminals 25 and 28 and converts these analog signals into a digital output signal at an output terminal M. The construction and operation of the converter 26 will be described in detail subsequently in connection with the discussion of FIG. 3 which represents a preferred embodiment of the converter 26. The terminal M is coupled as one of two inputs to an AND gate 32, the other input being supplied by a terminal A. The output of the AND gate 32 is coupled to an input terminal 33 of a counter 34 which has a reset terminal I and an overflow indicator terminal 35. The overflow terminal is directly coupled to a control terminal N of the converter 26.

The count of the counter 34 is coupled to input terminals 36 and 37 of a read only memory (ROM) 38 which has page selector terminals J and K. The ROM 38 essentially preforms a table look up operation in which the count of the counter 34 is monitored and a corresponding digital output is supplied on lines 40 and 41 to a digital to analog (D/A) converter 42 which has an output terminal 43 and a reference terminal 44 which also serves as the wiper arm terminal of a controllable switch 45 (shown dashed). Thus the read only memory 38 receives a count at the terminals 36 and 37 and produces a corresponding output digital signal on the lines 40 and 41 wherein the correspondence is determined by the logic states present at the terminals J and K which select the memory correspondence that has been programmed into the read only memory. The operation of such a read only memory is well known to those of average skill in the art and many such programmable read only memories are currently available. The D/A converter 42 is a component which is readily available as an integrated circuit. An integrated circuit MC1508, manufactured by Motorola, Inc., a corporation of the State of Delaware in the United States of America, is readily usable for the converter 42. This converter 42 will multiply the digital input received on the input lines 40 and 41 by the analog voltage applied to the reference terminal 44 and produce, as the resultant product, an analog signal at its output terminal 43.

The controllable switch 45 is a two position switch similar to switch 17 which has its operative positions determined by the voltage at a control terminal E. In a first position selected by a low voltage at terminal E, the wiper terminal 44 is connected to a terminal 46 to which a stable reference voltage is applied. In a second position of switch 45 selected by a high voltage at terminal E, the wiper terminal 44 is connected to a terminal 47 that is coupled to the output of a sample and hold device 48.

The output terminal 43 of the D/A converter 42 is coupled as an input to the sample and hold device 48 and is also coupled as an input to a sample and hold device 49 and a sample and hold device 50. Signals at control terminals F, G and H control the activation of the sample and hold devices 48, 49 and 50, respectively. When these devices are activated, they monitor the input present at the terminal 43, store this analog signal value and provide the stored analog signal as an output until the next activation. Such sample and hold devices can be readily implemented, for example, by using a controllable relay and a holding capacitor.

The output of the sample and hold device 49 is coupled to an exhaust gas recirculation (EGR) controller 51 and a wiper arm terminal 52 of a two position controllable switch 53 (shown dashed). The position of the switch 53 is controlled by signals provided at a control terminal D. In a first position of the switch 53 corresponding to a low voltage at terminal D, the terminal 52 is coupled to an isolated terminal 54. In a second position of the switch 53, selected by a high voltage at D, the terminal 52 is electrically connected to a terminal 54 which is directly connected to the terminal 29 of the controllable switch 23. The output of the sample and hold device 50 is coupled to a spark timing adjuster 56 which also receives an input from the terminal 12. The operation of the EGR controller 51 and spark timing adjuster 56 will now be briefly discussed.

The EGR controller 51 basically represents a controllable valve which is opened and closed in accordance with the magnitude of the output signal provided by the sample and hold circuit 49. The opening and closing of the valve contained in the EGR controller 51 will determine how much exhaust gas is to be recirculated into the engine cylinders for further ignition. Such EGR controllers can be readily implemented and prior EGR systems have used a solenoid which opens and closes a valve to determine when exhaust gas recirculation should be implemented.

The spark timing adjuster 56 receives the digital engine position sensor signal provided at the terminal 12 and adjusts the occurence of spark timing ignitions with respect to this signal in accordance with the magnitude of the analog output signal provided by the sample and hold circuit 50. Thus the spark timing adjuster can be implemented by use of apparatus such as that shown in U.S. Pat. No. 3,785,356 in which the mechanical angular displacement of the distributor of an ignition system is adjusted by a servomechanism motor controlled by an analog signal. Alternatively, the spark timing adjuster 56 could also be implemented by apparatus such as that shown in U.S. Pat. No. 3,910,243 which illustrates apparatus for producing an electronically variable spark timing advance that is controlled by the magnitude of an analog signal. Thus both the EGR controller 51 and the spark timing adjuster 56 represent apparatus which is known to those of average skill in the art and can be readily implemented.

To control the operation of the spark timing and exhaust gas recirculation control system 10, a high frequency clock 57 is provided which continuously produces a series of high frequency timing pulses at an output terminal A which is coupled as an input to a control logic and timer apparatus 58. The control apparatus 58 receives the high frequency clock pulses and periodically produces a sequence of timing waveforms at a series of output terminals B through K. These output terminals are coupled to the correspondingly designated control terminals of various blocks illustrated in the spark timing and EGR control system 10. The connections between the output terminals of the control apparatus 58 and the various corresponding control terminals have been omitted for the purposes of clarity of FIG. 1. The control logic and timer apparatus 58 can readily be implemented by the appropriate use of a down counter, which receives the clock pulses from the terminal A, and various logic gates which will produce the desired waveforms at the terminals B through K.

Figure 4:
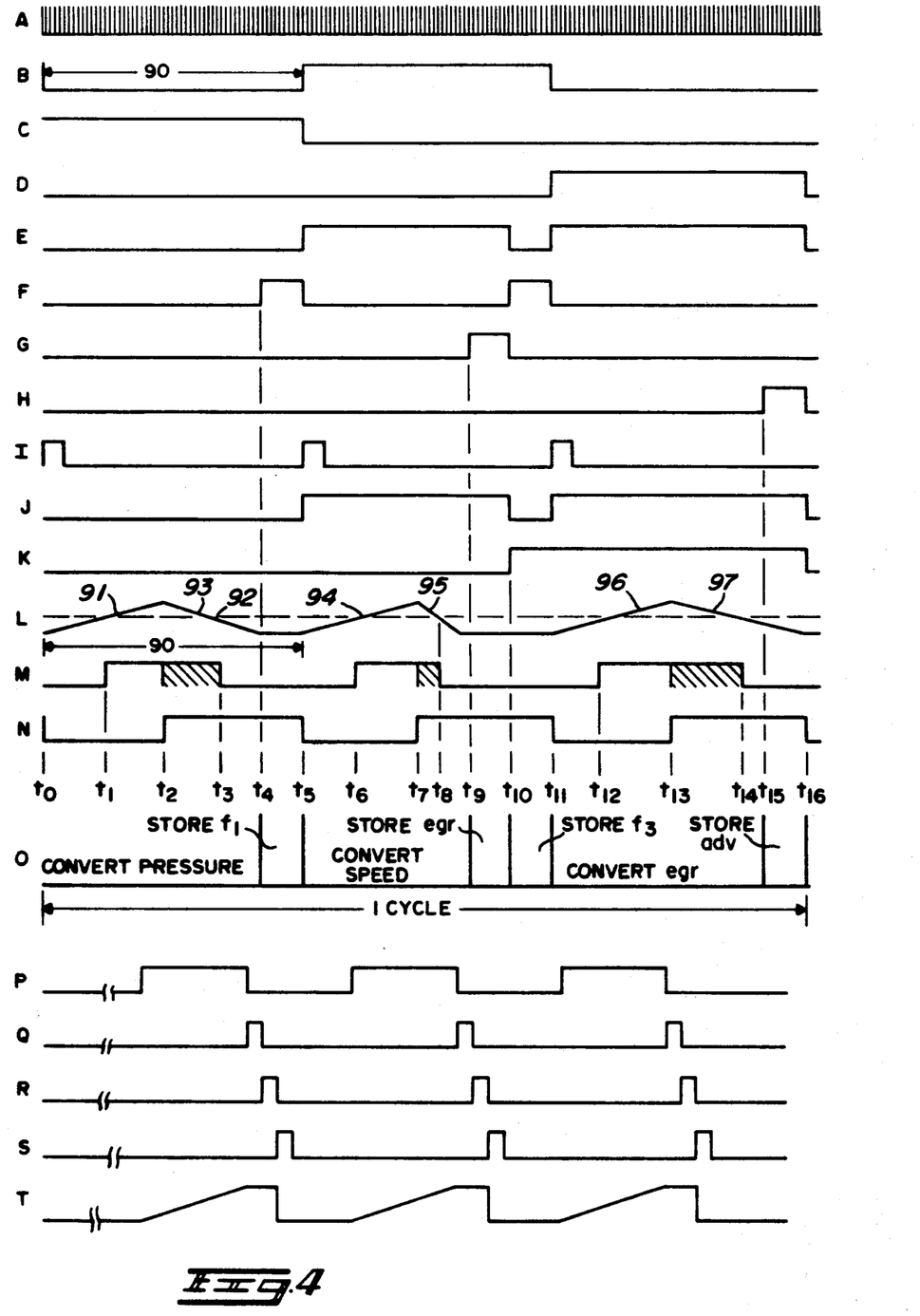
FIG. 4 is a series of graphs A through T which illustrate various signal waveforms produced by the control system shown in FIG. 1.

Typical examples of the waveforms produced by the apparatus 58 are shown in FIG. 4 in which the waveforms present at the terminals A through K are shown in the corresponding graphs A through K in FIG. 4. The graphs A through K are all drawn to the same horizontal time scale and the verticle axes of these graphs represent the magnitude of the voltage signals produced at the corresponding terminals. The graphs L through O also have the same horizontal time scale. The graphs L through N represent the waveforms produced by the control system 10 in response to the signals A through K, whereas the graph O represents a word explanation of the sequential operation of the control system 10 as it proceeds through one complete cycle of operation. While only one cycle of operation is shown in FIG. 4, the present invention contemplates periodic reproduction of the single cycle shown in FIG. 4. Graphs P through T are also illustrated in FIG. 4 and the vertical axes of these graphs is also representative of voltage magnitude. The horizontal axes of the graphs P through T represent time and they all have the same horizontal scaling factor, which is not necessarily the same as the horizontal scale of the graphs A through O.

The operation of the spark timing and EGR control system 10 will now be briefly discussed with respect to how the overall system 10 functions. The discussion will basically follow the operations which occur during one full cycle of the timing waveforms A through K and will generally correspond to the word explanation given in the graph O in FIG. 4.

Initially, the system 10 will convert the engine vacuum pressure to an analog voltage and provide this voltage at the terminal 28. Basically, the converter 26, the ROM 38 and the D/A converter 42 will convert the analog pressure related signal at the terminal 28 into a single point of a complex analog output function $f_1$ and this point will be stored in the sample and hold circuit 48. Subsequently, an analog signal proportional to the period of engine revolution will be provided at the terminal 25. The A/D converter 26 will sample this analog voltage and produce a digital output which is inversely related to the voltage at the terminal 25 and therefore directly related to engine speed. This digital voltage, via the ROM 38, will be converted into a single point of a complex digital function $f_2$ which will be multiplied by the stored point of the function $f_1$ by the D/A converter 42. The output product of the D/A converter 42 will then be stored in the sample and hold circuit 49 and will represent the analog voltage (egr) that controls the EGR controller 51. Then a different page selector input will be applied to the ROM 38 and a single point of a complex function $f_3$ will result as the output of the D/A converter 42, wherein the function $f_3$ relates engine speed to the amount of desired spark timing advance. The single point of the function $f_3$ will then be stored in the sample and hold circuit 48. Subsequently, the controlled EGR voltage held by the circuit 49 will be applied as an input signal to the A/D converter 26 at its input terminal 28. The converter 26 and the ROM 38 will produce a corresponding output point on the lines 40 and 41 and the D/A converter 42 will multiply this by the point of the function $f_3$ stored in the sample and hold circuit 48. The resultant output (adv) of the converter 42 will represent an analog voltage related to the amount of desired spark timing advance, and this will be stored by the sample and hold circuit 50. The exact operation of the control system 10 will be subsequently explained in detail wherein the functions $f_1$ through $f_4$ and the control voltages egr and adv will be precisely defined.

The construction and operation of the analog converter 20 will now be discussed in conjunction with FIG. 2 and the waveforms P through T shown in FIG. 4. Subsequently, the construction and operation of the dual slope A/D converter 26 will be discussed in conjunction with FIG. 3 and waveforms L, M and N in FIG. 4, as well as the waveform B shown in FIG. 4. After that, the operation of the entire control system 10 will be discussed in detail.

Figure 2:
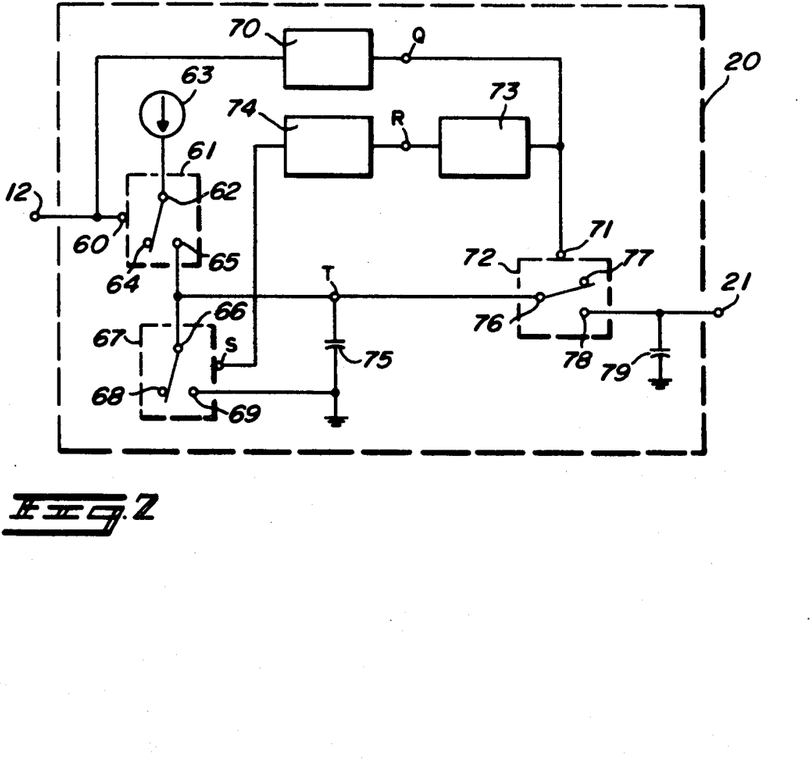
FIG. 2 is a block and schematic diagram of one of the components illustrated in FIG. 1.

FIG. 2 illustrates an embodiment of the analog converter 20. Identical reference numbers have been used to identify corresponding components. The output terminal 12 of the engine position sensor 11 is coupled to a control terminal 60 of a controllable two position switch 61 (shown dashed) which has a wiper arm terminal 62 that receives current directly from a current source 63. In one position of the switch 61, the terminal 62 is connected to an isolated terminal 64. In the other position the terminal 62 is electrically connected to a terminal 65 which is connected to a wiper arm terminal 66 of a two position switch 67 (shown dashed) and also to a terminal T. The positions of the switch 67 are determined by signals provided at a control terminal S of this switch. In a first position of switch 67 the wiper arm terminal 66 is connected to an isolated terminal 68, in the second position the terminal 66 is connected to a terminal 69 that is directly connected to ground. The terminal 12 is also coupled as an input to a first monostable multivibrator 70 which produces an output at a terminal Q that is directly connected to a control terminal 71 of a two position controllable switch 72 (shown dashed). The signal at the terminal Q is also provided as an input to a second monostable multivibrator 73 which produces an output at a terminal R that is connected as an input to a third monostable multivibrator 74 that produces an output directly connected to the terminal S. The terminal T is coupled to ground through a capacitor 75 and is directly connected to a wiper arm terminal 76 of the two position switch 72. In the first position of the switch 72 the terminal 76 is connected to an isolated terminal 77, and in the second position of the switch 72 the terminal 76 is connected to a terminal 78 that is directly connected to the analog converter output terminal 21 and is coupled to ground through a capacitor 79. The operation of the analog converter 20 illustrated in FIG. 2 is as follows.

At the terminal 12 the engine position sensor 11 produces a signal corresponding to the waveform P shown in FIG. 4 which represents a signal having a frequency proportional to engine speed and therefore a period inversely proportional to engine speed. Sensors such as sensor 11 are commonly hall effect or magnetic pick up sensors which generate an alternating signal having a frequency proportional to the rotational speed of the engine.

The signal present at the terminal 12 is received at the control terminal 60 of the switch 61. During the positive cycle of the waveform P, the switch 61 will connect the wiper terminal 62 to the terminal 65 such that the current source 63 will commence to charge up the capacitor 75. The voltage across the capacitor 75 is represented by the waveform T in FIG. 4. At the termination of each of the positive cycles of the waveform P, the monostable multivibrator 70 will react to the negative transition and produce corresponding short duration pulses at the terminal Q. The waveform of these short duration pulses is represented in the graph Q in FIG. 4. During these short duration pulses, the switch 72 will be actuated such that the wiper terminal 76 will be connected to the terminal 78 and that will result in charging the capacitor 79 in accordance with the voltage developed at the terminal T. An isolation stage could be provided between the terminal T and the capacitor 79 to provide that the voltage developed across the capacitor 75 would be directly losslessly transferred to the capacitor 79 during the short duration pulses of the waveform Q. Thus essentially the switch 72 and the capacitor 79 form a sample and hold portion of the analog converter 20 in which the peak magnitude of the voltage at the terminal T is sampled during the short duration pulses of the waveform Q and a voltage is produced across the capacitor 79 that is related to this peak value.

In response to the termination of the short pulses of the waveform Q, the monostable multivibrator 73 reacts and produces additional short duration pulses at the terminal R. In response to the termination of these additional short duration pulses shown in waveform R of FIG. 4, the monostable multivibrator 74 produces short duration pulses at the terminal S which are shown in the FIG. 4 graph identically referenced by the letter S. These short duration pulses at the terminal S result in having the switch 67 connect the terminal 66 directly to ground and this in turn results in totally discharging the capacitor 75 such that it is now ready to be charged again upon the occurence of another positive cycle of the waveform P. Thus in essence the analog converter 20 produces a peak voltage at the terminal T which is proportional to the duration of the positive cycle of the waveform P at terminal 12. This peak value is sampled by the switch 72 and transferred to the capacitor 79 which is held at the transferred peak value until the next sampling of the voltage across the capacitor 75. In this manner an analog signal is produced at the terminal 21 which is proportional to the period of the waveform P which represents the rotational position of the engine crankshaft. The embodiment of the converter 20 shown in FIG. 2 is intended to merely illustrate one way of providing the desired engine period proportional analog signal present at terminal 21.

Figure 3:
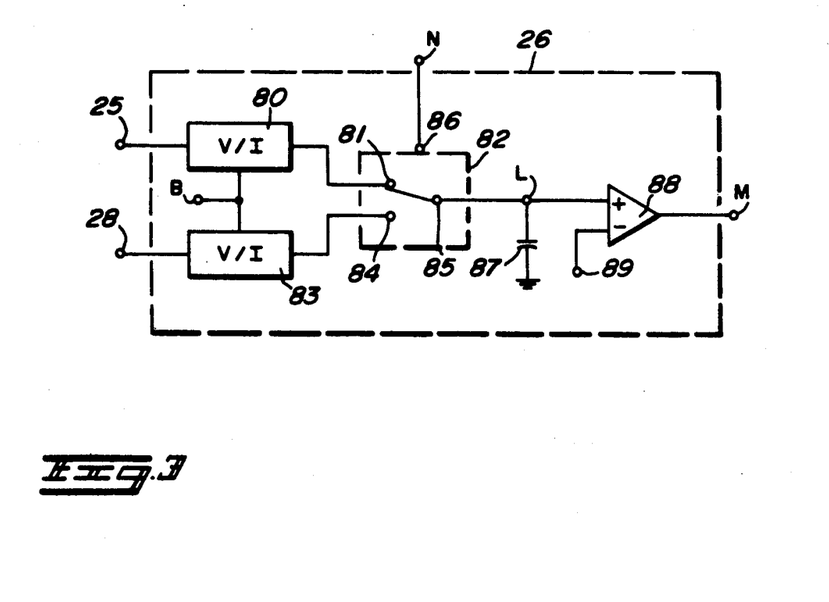
FIG. 3 is a block and schematic diagram of another one of the components illustrated in FIG. 1.

FIG. 3 illustrates a preferred embodiment of the dual slope A/D converter 26 with identical reference numbers and letters being used for corresponding components and terminals. The terminal 25 is coupled as an input to a voltage to current converter 80 which produces an output that is coupled to a terminal 81 of a two position controllable switch 82 (shown dashed). The terminal 28 is coupled as an input to a voltage to current converter 83 which produces an output that is coupled to a terminal 84 of the switch 82 which also includes a wiper arm terminal 85 and a control terminal 86. In one position of the switch 82 the terminals 81 and 85 are directly connected together and in the other position of the switch 82 the terminals 84 and 85 are interconnected. The control terminal 86 is directly connected to the terminal N of the converter 26 and the terminal 85 is directly connected to a terminal L which is coupled to ground through a capacitor 87 and is directly connected to the positive input of a comparator 88. The comparator receives a negative input from a reference terminal 89 which preferably has a fixed voltage reference level applied to it. The terminal B is coupled to each of the converters 80 and 83 and oppositely controls the polarity of these converters as will be subsequently discussed. The operation of the converter 26 shown in FIG. 3 will now be discussed with reference to the system 10 and the waveforms shown in FIG. 4.

Initially, during a time period 90 from times $t_0$ to $t_5$ the control logic timer 58 will produce a high voltage logic state at the terminal C and a low voltage logic state at the terminal B. This results in having the switch 17 connect the output of the summer 15 directly to the terminal 19 while the switch 23 is positioned by the waveform B such that the terminal 24 is directly connected to the reference voltage at the terminal 32 while the terminal 27 receives the analog pressure voltage present at the terminal 19. Thus during the period 90 the terminal 25 has a fixed reference voltage applied to it and terminal 28 has an analog voltage applied to it related to the amount of vacuum manifold pressure.

The voltage to current (V/I) converters 80 and 83 are merely voltage controlled current sources having controllable polarities and thus are components well known to those of average skill in the art. The terminal B is coupled to both of the converters 80 and 83 and essentially selects the polarity of the voltage to current transformation performed by each of these converters. For a low voltage logic state present at the terminal B, the converter 80 will produce a current which flows from the terminal 81 to the converter 80 and which has a magnitude determined by the magnitude of the analog voltage present at the terminal 25. For a high logic state at the terminal B the converter 80 will produce a current determined by the magnitude of the voltage at the terminal 25 which flows into the terminal 81 from the converter 80. The operation of the converter 83 is precisely the inverse of the operation of the converter 80 in that for a low logic state at B the converter 83 implements a current flowing to the terminal 84 from the converter 83 and a reverse flowing current is implemented for a positive logic state at the terminal B. Thus during the time period 90 shown in FIG. 4, the converter 83 will produce a current which flows into the terminal 84 that is related to the magnitude of the analog pressure voltage present at the terminal 28 while the converter 80 will produce a current that flows from the terminal 81 to the converter 80 which is related to the magnitude of the fixed reference voltage that is present at the terminal 25.

At the commencement of the time period 90 at $t_0$ the converter 83 will supply a constant current related to the engine vacuum pressure through terminals 84 and 85 to charge up the capacitor 87 at a constant linear rate designated by the linear segment 91 in the waveform L shown in FIG. 4 which represents the voltage across the capacitor 87. When the voltage on the capacitor 87 exceeds the reference voltage present at the terminal 89, which is shown dashed as the voltage reference level 92 in graph L, the comparator 88 will produce a high voltage logic state at the terminal M. The high logic state will be maintained as long as the positive input to the comparator 88 is greater than the reference voltage 92. The signal at the terminal M is represented by the graph M in FIG. 4.

With a high logic state at the terminal M, the AND gate 32 shown in FIG. 1 will now pass clock pulses present at the terminal A through the AND gate to the counter 34. This will result in the counter counting the clock pulses until an overflow count is indicated at the terminal 35. When this occurs a high logic state will be produced at the terminal 35 and the counter will continue counting. The high logic state at terminal 35 results in a high logic state at the terminals N and 86 which in turn results in connecting the wiper arm terminal 85 to terminal 81. The effect of this is to discharge the voltage across the capacitor 87 at a predetermined constant current which depends upon the constant reference voltage being applied to the terminal 25. Thus the waveform of the capacitor voltage present at the terminal L will now be decreased at a linear rate designated by a line segment 93 in graph L and this rate of decrease will continue until the capacitor 87 is totally discharged.

The time between a time $t_1$, when the waveform L first exceeds the voltage reference level 92, and a time $t_2$, when an overflow indication is first produced by the counter 34 at the terminal 35, will be a fixed predetermined amount of the time since during this time a fixed number of clock pulses equal to the capacity of the counter 34 will be counted by the counter. At the time $t_2$ the voltage on the capacitor 87 will begin to decrease at a linear rate determined by the voltage at the terminal 25. The counter 34 will continue to count received clock pulses until a subsequent time $t_3$ at which the line segment 93 will equal the voltage reference level 92. At this time, a low logic state will be produced at the terminal M and the AND gate 32 will inhibit the passage of further clock pulses to the counter 34 and therefore maintain the counter at its last count.

Until the counter 34 is reset, the count stored in the counter 34 will be equal to the number of clock pulses received by the counter 34 during the period of time from $t_2$ to $t_3$. This count can be shown to be directly proportional to the ratio of the slope of line segment 91 to the slope of the line segment 93 (see subsequent equation 3 and its associated explanation). Since the slope of the line segment 91 is dependent upon the engine vacuum pressure and the slope of the line segment 93 is maintained at a constant level since it depends on the reference voltage at the terminal 32, the count maintained in the counter 34 after the time $t_3$ is directly proportional to the engine vacuum pressure voltage at terminal 19. Thus the converter 26, the AND gate 32 and the counter 34 essentially function in this first time period 90 as a standard dual slope A/D converter circuit whose operation is well known to those of average skill in the art.

The output of the counter 34 is a digital count signal which is received by the input terminals 36 and 37 of the read only memory (ROM) 38. While only two input terminals to the read only memory are shown, it is contemplated that many more input terminals could exist in order to monitor a higher count of the counter 34. The ROM 38 essentially performs a table look up function and produces an output count on the lines 40 and 41 in direct correspondence to the input count received at the terminals 36 and 37. Thus for each possible received digital signal count from the counter 34, the ROM 38 provides a different corresponding count on its output terminals 40 and 41. Essentially the read only memory 38 implements a digital to digital transfer function for the count of the counter 34.

The page selecting terminals J and K of the ROM 38 essentially select which one of four different transfer functions should be implemented by the ROM 38. During the time period 90, the terminals J and K are both at low logic states due to the waveforms J and K produced by the control logic timer 58. This results in selecting a first transfer function for the ROM 38 which converts the count of the counter 34, which is proportional to the engine vacuum pressure, into a corresponding digital number which relates the amount of exhaust gas recirculation control voltage that should be produced in response to the sensed engine vacuum pressure.

The digital signals present on the lines 40 and 41 are converted by the D/A converter 42 into an analog signal present at the terminal 43. During this conversion, the terminal 44, which is the reference voltage multiplying terminal of the D/A converter 42, is directly connected to the terminal 46 which has a stable reference voltage applied to it. This position of the switch 45 is controlled by the waveform E shown in FIG. 4.

During the period 90 at a time $t_4$, which is subsequent to the time $t_3$, a high logic state is produced at the terminal F by the control logic and timer circuit 58. This results in activating the circuit 48 to sample the analog voltage present at the terminal 43. This voltage is held at the terminal 47 until the circuit 48 is subsequently activated by another high logic pulse created at the terminal F. Thus the voltage being held at the terminal 47 represents an analog voltage which is a complex function of the pressures sensed by the sensors 13 and 14.

In order to understand the operation of the present spark timing and exhaust gas recirculation control system 10, it is necessary to keep in mind that the desired result of the system 10 is to produce a first analog signal which determines the amount of exhaust gas recirculation that is required in response to the engine variables of speed and vacuum pressure, and a second analog signal which determines the desired amount of spark timing adjustment as a function of these same variables. These analog output voltages can be represented by the following two equations:

1. $egr = [f_1(p)][f_2(s)]$

2. $adv = [f_3(s)][f_4(egr)]$ where egr is the resultant analog control voltage for controlling exhaust gas recirculation; adv is the resultant analog control voltage for controlling spark timing adjustment; p is the sensed engine vacuum pressure, and s is the engine speed (which is the inverse of the period of engine revolution.

The analog quantity stored at terminal 47 by the sample and hold circuit 48 represents a single point of the analog function $f_1(p)$, where the relationship between the function $f_1$ and the variable p has been implemented by the first transfer function of the ROM 38 which was selected by the page selection terminals J and K. The equations 1 and 2 illustrate that the exhaust gas recirculation control voltage (egr) is the product of a first complex function $f_1$ that depends upon vacuum pressure and a second complex function $f_2$ which depends upon engine speed. In the control system 10, individual values for the functions $f_1$ and $f_2$ will be periodically calculated and multiplied together to formulate the analog exhaust control voltage egr. In addition, the functions $f_3$ and $f_4$ will also be periodically calculated and multiplied together to formulate the analog timing control voltage adv.

The control voltage egr will be produced as the output of the sample and hold circuit 49 and this information will be up dated for every positive logic pulse which occurs at the terminal G. The sample and hold circuit 50 will produce as its output the analog control voltage adv, and this voltage will up dated for every positive logic pulse which occurs at the terminal H. In this manner the control system 10 produces analog control voltages which are periodically up dated and which represent the multiplication of two complex functions that depend upon the primary engine variables of engine speed and engine vacuum pressure.

At the end of the predetermined time period 90, which occurs at a time $t_5$ that is subsequent to the time $t_4$, a high logic pulse is created at the terminal I which resets the counter 34 and overflow terminal 35 to zero. Also at this time the switch 17 responds to a low logic state now created at the terminal C to connect the wiper arm terminal 16 to the isolated terminal 17 and therefore isolate the terminal 19 from the output of the summer 15. In addition, a high logic state is created at the terminal B which results in switching the wiper arm terminals 24 and 27 to the terminals 22 and 30, respectively. This results in now applying the fixed reference voltage $V_{ref}$ to the terminal 28 while applying a variable analog voltage directly proportional to the period of engine revolution to the terminal 25. The high logic state at the terminal B also reverses the polarity selection for the converters 80 and 83 of the dual slope A/D converter 26.

The basic result of the changes which occur at $t_5$ is that the voltage at the terminal L will now first rise at a linear rate determined by the fixed reference voltage at the terminal 28. This linear rate of rise is represented by the line segment 94 on the graph L in FIG. 4. When the voltage at the terminal L exceeds the reference voltage 92 at the terminal 89 at a subsequent time $t_6$, then clock pulses will be passed to the counter 34. When the counter 34 again exceeds its possible count an overflow indication is created at the terminal 35 at a subsequent predetermined time $t_7$. This overflow indication at the time $t_7$ will result in switching the controllable switch 82 such that the voltage at the terminal L will be discharged at a linear rate determined by the variable analog signal present at the terminal 25, which is directly proportional to the period of engine revolution. The linear discharge of the capacitor 87 is represented by the linear decrease of the voltage at the terminal L shown by a line segment 95 in the waveform L shown in FIG. 4. When the line segment 95 equals the voltage reference level 92 at a time $t_8$, the comparator 88 via the AND gate 32 will stop the counter 34 from counting. At this time $t_8$ a count will be maintained in the counter 34 which is a digital representation of the inverse of the magnitude of the variable analog voltage present at the terminal 25. This occurs because the rate of discharge of the capacitor represented by the line segment 95, rather than the rate of charging, is now determined by a variable analog voltage. This relationship is shown by the explanation contained in the following paragraph.

The analog to digital transfer characteristics of the converter 26 can be represented by the following equation:

3. $\Delta_2 = (\Delta_1)$ (Rise slope/Fall slope)

where $\Delta_2 = t_3 - t_2$, or $t_8 - t_7$; $\Delta_1 = t_2 - t_1$, or $t_7 - t_6$; Rise slope = slope of 91, or 94; and Fall slope = slope of 93, or 95.

During the time period 90, the output of the converter 26 is $\Delta_2$ and this is the time between $t_3$ and $t_2$. This time period is directly related to the count which is stored in the counter 34. This count is read by the ROM 38, transferred into analog form by the D/A converter 42 and sampled and held by the circuit 48. The output $\Delta_2$ during the time period 90 is a direct function of the analog voltage representing engine vacuum pressure since the slope 91 is directly proportional to this analog voltage and the slope 93 and $\Delta_1$ are constant. However, at the time $t_8$, the output $\Delta_2$ of the converter 26 is equal to the time between $t_8$ and $t_7$. This time is inversely proportional to the analog signal present at the terminal 25 since the rise slope 94 is maintained at a constant level and the fall slope 95 is directly determined by the magnitude of the analog voltage. Thus equation 3 above illustrates how the dual slope A/D converter 26 can be utilized to produce a digital output signal which is either a direct function of an analog input signal or an inverse function of an analog input signal.

In the present case, the converter 26 during the period 90 produces a digital output, via counter 34, which is a direct function of the engine vacuum pressure. At the time $t_8$, the converter 26 produces a digital output, via the count stored in the counter 34, which is an inverse function of the analog signal at the terminal 25 which is directly proportional to the period of engine revolution. Thus the count stored in the counter 34 at the time $t_8$ is a digital count which is directly proportional to engine speed rather than the period of engine revolution. This is important since both the adv and egr desired analog output voltages are functions of engine speed and not the period of engine revolution. Thus by effectively reversing the operation of the converter 26, a digital output signal is produced which is inversely related to the magnitude of an analog input signal and this digital output signal is subsequently used to develop a spark timing control voltage (adv) as well as an EGR control voltage (egr). The production of the inverse digital output signal is basically created by setting the charge on the capacitor 87 to a constant predetermined level and then discharging a capacitor at a linear rate which is directly proportional to the magnitude of a variable input analog signal.

At a subsequent time $t_9$, a positive logic state is produced at the terminal G which will activate the sample and hold circuit 49 and result in storing the voltage then present at the terminal 43 as the output of the circuit 49 until this circuit is subsequently activated. The output of the circuit 49 is the desired exhaust gas recirculation analog control voltage egr as defined in equation 1.

At the time $t_9$ the D/A converter 42 effectively receives the digital output signal of the ROM 38 on the lines 40 and 41. This digital output signal is a complex function of the digital count stored in the counter 34 which is directly proportional to engine speed. The complex relationship between the digital count in counter 34 and the digital signal on lines 40 and 41 is determined by the read only memory circuit 38 and the transfer characteristics selected for it by the signals present at the terminals J and K. The D/A converter 42 essentially receives the complex digital output signal from the ROM 38 and multiplies it by whatever analog reference voltage is present at the terminal 44. This is just a standard operation of a typical D/A converter. However, at the time $t_9$, the voltage present at the terminal 44 is the output of the sample and hold circuit 48 which is coupled to the terminal 44 by the switch 45. Generally D/A converters are operated such that the reference terminal 44 is always connected to a constant reference voltage. However, in the present system, complex function multiplication is implemented in the control system 10 by providing a reference voltage at the terminal 44 that is a complex function of an analog input signal.

Referring to equation 1, the operation of the present system can be more readily understood. Essentially, the ignition system 10 monitors engine vaccum pressure and periodically produces a complex analog output signal at the terminal 43 which is sampled and held by the circuit 48. This complex analog signal will correspond to one point of the function $f_1$ in equation 1. During a subsequent processing step, a digital output signal is provided on the lines 40 and 41 which relates engine speed to a desired amount of exhaust gas recirculation. The D/A converter 42 receives this digital complex function and multiplies it by the analog complex function held by the circuit 48 to produce an analog output signal at the terminal 43 which is essentially the product of the complex functions $f_1$ and $f_2$. Thus the analog signal provided at the terminal 43 directly corresponds to the desired egr control voltage. This control voltage is sampled at the time $t_9$ by the sample and hold circuit 49 which provides this signal as an input to the EGR controller 51.

Essentially, the system 10 provides a programmable transfer function means represented by the A/D converter 26, the ROM 38 and the D/A converter 42. The system generates a first analog input signal directly linearly related to engine vacuum pressure and selects a first relationship which relates the engine vacuum pressure to the amount of desired EGR control voltage. A storage means comprising the sample and hold circuit 48 then stores the output of the programmable transfer function means produced in response to this first pressure variable input signal. Subsequently, a second analog input signal proportional to the period of engine revolution is applied to the programmable transfer function means and a second relationship for the transfer function means is selected. The second relationship is determined by the new table look up selected by the waveforms produced at the terminals J and K as well as reversing the connections of the A/D converter 26 so that an intermediate digital output signal is produced at terminals 40 and 41 which is an inverse function of the engine period input signal. The switch 45 then effectively enables the D/A converter 42 to multiply the analog output signal produced in response to the first input signal by the intermediate digital output signal produced in response to the second input signal such that a final analog output signal (egr) is produced at the terminal 43 which is the product of a first complex function relating engine vacuum pressure to the desired amount of the exhaust gas recirculation control and a second function relating engine speed to the same quantity.

In the preferred embodiment of the present invention, at a time $t_{10}$ subsequent to the time $t_9$, the switch 45 applies a fixed reference voltage to the terminal 44 due to the waveform at the terminal E being returned to a low voltage state. Also at this time the sample and hold circuit 48 is activated and the logic states present at the terminals J and K are once again changed. This results in selecting a new table look up for the ROM 38 while the counter 34 still maintains a digital count directly proportional to engine speed. In addition, the D/A converter 42 will now multiply the digital output of the ROM 38 by a constant reference voltage and the output of the converter 42 will be stored at the terminal 47 by the sample and hold circuit 48. Thus the voltage now stored at the terminal 47 will correspond to the function $f_3$ in equation 2. This is because the logic states present at the terminals J and K have now selected a new transfer function for the ROM 38 and this new transfer function relates the speed proportional count of the counter 34 to the amount of spark timing advance required as a function of engine speed. It should be noted that this additional function $f_3$ is produced by using the speed proportional count which already was being maintained in the counter 34 after the time $t_8$.

At a time $t_{11}$ subsequent to the time $t_{10}$, the logic states at the terminals J and K are once again changed to select still another transfer function for the ROM 38. Also at this time, a positive logic state is provided at the terminals D and E while a short duration pulse is provided at the terminal I to zero the count of the counter 34. In addition, the terminal B is returned to a low voltage logic state. The effect of all of these waveforms produced by the control logic and timer circuit 58 at the time $t_{11}$ is that the output signal egr being held by the circuit 49 will now be coupled as an analog input signal to the terminal 28 of the A/D converter 26 while the terminal 25 will be maintained at the constant reference voltage $V_{ref}$. Thus the A/D converter 26 will process the egr signal just as it processed the engine vacuum pressure signal produced at the output of the summer 15 during the time period 90.

Thus at $t_{11}$ the voltage at the terminal 87 will increase at a linear rate determined by the magnitude of egr. The linear increase is represented by the straight line segment 96 shown in graph L of FIG. 4. When the magnitude of this voltage exceeds the reference voltage 92 at a time $t_{12}$ the AND gate 32 will commence coupling clock pulses to the counter 34. At a subsequent time $t_{13}$ an overflow indication is once more produced which results in discharging the voltage across the capacitor 87 at a linear rate represented by the line segment 97 in the graph L of FIG. 4. The decrease rate is determined by $V_{ref}$. When the capacitor voltage decreases to the point that it is equal to the reference level 92 (at a subsequent time $t_{14}$), the counter 34 will be prevented from further counting and the count stored in the counter 34 will be directly proportional to the magnitude of the analog input signal, which this time is the output signal egr. At a subsequent time $t_{15}$ a positive logic state is created at the terminal H. This activates the sample and hold circuit 50 such that the analog output signal present at the terminal 43 will be stored as the output of the circuit 50. This stored analog signal represents the amount of desired spark timing advance and is equal to the quantity adv as stated in equation 2. This occurs because the output of the ROM 38, which is a complex digital function relating the amount of desired advance to the magnitude of the signal egr, is mulitplied by the analog signal present at the terminal 47, which is a complex function ($f_3$) of engine speed that relates the amount of desired advance to the primary engine variable of engine speed. Thus effectively, the D/A converter 42 at the time $t_{15}$ through a time $t_{16}$ will produce as an output the signal adv as defined in equation 2; wherein the analog signal present at the terminal 44 represents the function $f_3$ and the digital input signal received by the D/A converter 42 represents a digital expression of the function $f_4$. In this manner the D/A converter 42 produces the function adv in equation 2 in an manner substantially similar to the way the function egr, as expressed in equation 1, was produced. At the time $t_{16}$ the entire cycle of events is repeated.

Thus the present invention has provided a spark timing and ignition control system 10 which monitors two primary engine variables such as engine speed and engine vacuum pressure and produces an analog output voltage (egr) that controls exhaust gas recirculation as well as an analog output voltage (adv) which controls the occurence of engine spark ignitions. All of this is accomplished by using only one A/D and one D/A converter and a single read only memory which is coupled between these converters. Thus the present system 10 uses a minimal amount of hardware to implement four different complex functional relationships which relate the primary engine variables of speed and engine vacuum pressure to the amount of exhaust gas recirculation and engine spark timing which are desired. In addition, the present system 10 illustrates a way to monitor an analog input signal and produce an output signal which is a function of the inverse of the analog input signal. The present invention also provides a way of selectively processing analog input signals to produce output signals which either vary directly or inversely with the input signals. Also a complex analog output signal has been implemented as a function of an analog input signal without the use of many different zener diodes.

While we have shown and described specific embodiments of this invention, further modifications and improvements will occur to those skilled in the art. All such modifications which retain the basic underlying principles disclosed and claimed herein are within the scope of this invention.

We claim:

1. A spark timing and exhaust gas recirculation control system for an internal combustion engine, said system including:
   a signal processing circuit for developing an output which is a complex function of two variable input signals representing different engine conditions, said circuit comprising:
   programmable transfer function means for receiving an input signal and producing an output signal having a selectable predetermined relationship to the input signal;
   means coupled to said programmable transfer function means for supplying a first analog input signal related to a first engine condition to said transfer function means while selecting a first transfer relationship therefor;
   first storage means coupled to said transfer function means for storing a quantity related to the output of said transfer function means produced in response to said first input signal;
   said supplying and selecting means including circuitry for supplying a second analog input signal related to a second engine condition to said transfer function means, after said first input signal, while selecting a second relationship for said transfer function means; and
   means coupled to said first storage means for multiplying the output of said programmable transfer function means produced in response to said second input signal by a factor related to said stored quantity to produce a complex output analog control signal, whereby a single programmable transfer function means can sequentially process two variable input signals related to engine conditions and develop a complex output signal control which is a product function of both of the input signals;
   and wherein said programmable transfer function means includes a function generator comprising:
   analog to digital converter means for receiving an input analog signal and producing a first output digital signal related to said input signal; and
   read only memory means coupled to said analog to digital converter means for receiving said first output digital signal as an input and producing a second output digital signal having a selectable predetermined functional relationship with respect to said first output digital signal;
   and wherein said multiplying means includes:
   digital to analog converter means coupled between said read only memory means and said storage means for receiving said second digital output signal and producing a first analog output signal related to said second digital output signal;
   and wherein said analog to digital (A/D) converter means comprises:
   at least one capacitor:
   first means coupled to said capacitor for setting the charge on said capacitor to a first predetermined charge level;
   second means coupled to said capacitor for subsequently altering the charge on said capacitor from said first predetermined charge level at a predetermined rate;
   means coupled to said capacitor for comparing the charge on said capacitor to a predetermined reference level and producing a digital signal related to the duration of time between the time of starting to alter the charge on said capacitor at said predetermined rate and the time that the charge on said capacitor is equal to the predetermined reference level; and
   means for sequentially activating said first and second means and maintaining said first predetermined charge level at a fixed value while determining said first predetermined rate directly in accordance with the variable magnitude of one of said input signals, whereby said produced digital signal is a function of the inverse of the magnitude of said one of said input signals.

2. A signal processing circuit for developing an output which is a complex function of two variable inputs, comprising:

programmable transfer function means for receiving an input signal and producing an output signal having a selectable predetermined relationship to the input signal;

means coupled to said programmable transfer function means for supplying a first input signal to said transfer function means while selecting a first transfer relationship therefor;

first storage means coupled to said transfer function means for storing a quantity related to the output of said transfer function means produced in response to said first input signal;

said supplying and selecting means including circuitry for supplying a second input signal to said transfer function means, after said first input signal, while selecting a second relationship for said transfer function means; and means coupled to said first storage means for multiplying the output of said programmable transfer function means produced in response to said second input signal by a factor related to said stored quantity to produce a complex output signal, whereby a single programmable transfer function means can sequentially process two variable input signals and develop a complex output signal which is a product function of both of the input signals.

3. A signal processing circuit according to claim 2 wherein said programmable transfer function means includes a read only memory means for receiving a digital input signal and producing a digital output signal in response thereto in accordance with a predetermined relationship.

4. A signal processing circuit according to claim 3 wherein said programmable transfer function means includes an analog to digital converter means which receives said first and second input signals and produces digital input signals for said read only memory means in response thereto.

5. A signal processing circuit according to claim 4 wherein said multiplying means includes a digital to analog converter means coupled to said read only memory means for receiving the digital output signals of said read only memory means and converting them to analog output signals.

6. A signal processing circuit according to claim 5 wherein said multiplying means includes a switch means for selectively coupling said stored quantity to said digital to analog converter means.

7. A signal processing circuit according to claim 6 wherein said supplying and selecting means includes a control means for producing various electrical timing signals that control the programmable transfer function means, the storage means, and the multiplying means.

8. A signal processing circuit according to claim 4 wherein said analog to digital (A/D) converter means receives one of said first and second input signals and produces a digital output signal directly related to said one of said input signals, and said A/D converter means receives the other one of said first and second input signals and produces a digital output signal inversely related to said other input signal.

9. A signal processing circuit according to claim 8 wherein said multiplying means includes a digital to analog convertor means coupled to said read only memory means for receiving the digital output signals of said read only memory means and converting them to analog output signals.

10. A signal processing circuit according to claim 2 which includes a second storage means coupled to said multiplying means for storing said complex output signal.

11. A signal processing circuit according to claim 10 which includes means for selecting another transfer function relationship for said programmable transfer function means while providing the complex output signal stored by said second storage means as an input signal to said transfer function means.

12. A signal processing circuit according to claim 10 wherein said supplying and selecting means provides for selecting a third transfer function relationship for said transfer function means, subsequent to the production of said complex output signal, and wherein said programmable transfer function means produces a second complex output signal in response to the selection of said third transfer function relationship.

13. A signal processing circuit according to claim 12 wherein said supplying and selecting means is coupled to said first storage means for enabling said first storage means to store said second complex output signal.

14. A signal processing circuit according to claim 13 wherein said supplying and selecting means provides said complex output signal as an input signal to said transfer function means while selecting a fourth transfer function relationship therefore.

15. A signal processing circuit according to claim 14 which includes a third storage means coupled to said multiplying means for storing the product of said stored second complex output signal multiplied by the output of the transfer function means produced in response to receiving said complex output signal as an input.

16. A spark timing and exhaust gas recirculation control system for an internal combustion engine, including a signal processing circuit for developing an output which is a complex function of two variable input signals representing different engine conditions, said circuit comprising:

programmable transfer function means for receiving an input signal and producing an output signal having a selectable predetermined relationship to the input signal;

means coupled to said programmable transfer function means for supplying a first input signal, related to a first engine condition to said transfer function means while selecting a first transfer relationship therefor;

first storage means coupled to said transfer function means for storing a quantity related to the output of said transfer function means produced in response to said first input signal;

said supplying and selecting means including circuitry for supplying a second input signal related to a second engine condition to said transfer function means, after said first input signal, while selecting a second relationship for said transfer function means; and means coupled to said first storage means for multiplying the output of said programmable transfer function means produced in response to said second input signal by a factor related to said stored quantity to produce a complex output control signal, whereby a single programmable transfer function means can sequentially process two variable input signals related to engine conditions and develop a complex output control signal which is a product function of both of the input signals.

17. An engine control system according to claim 16 wherein said programmable transfer function means includes a read only memory means for receiving a digital input signal and producing a digital output signal in response thereto in accordance with a predetermined relationship.

18. An engine control system according to claim 17 wherein said programmable transfer function means includes an analog to digital converter means which receives said first and second input signals and produces digital input signals for said read only memory means in response thereto.

19. An engine control system according to claim 18 wherein said multiplying means includes a digital to analog converter means coupled to said read only memory means for receiving the digital output signals of said read only memory means and converting them to analog output signals.

20. An engine control system according to claim 19 wherein said multiplying means include a switch means for selectively coupling said stored quantity to said digital to analog converter means.

21. An engine control system according to claim 18 wherein said analog to digital (A/D) converter means receives said first input signal and produces a digital output signal directly related to said first input signal and said A/D converter means receives said second input signal and produces a digital output signal inversely related to said second input signal.

22. An engine control system according to claim 21 wherein said first input signal is related to the magnitude of vacuum pressure produced by said engine and said second input signal is directly related to the period of engine revolution.

* * * * *